April 9, 1957 B. L. WILSON ET AL 2,788,222
SPRING MOUNT FOR THE ADJACENT ENDS OF SUSPENSION
SPRINGS IN A DUAL AXLE SYSTEM
Filed Dec. 18, 1953 2 Sheets-Sheet 1

*INVENTORS.*
BEN L. WILSON
WILLIAM A. LESTER
BY

*Knox & Knox*

ATTORNEY IN FACT
FOR APPLICANTS

April 9, 1957   B. L. WILSON ET AL   2,788,222
SPRING MOUNT FOR THE ADJACENT ENDS OF SUSPENSION
SPRINGS IN A DUAL AXLE SYSTEM
Filed Dec. 18, 1953   2 Sheets-Sheet 2
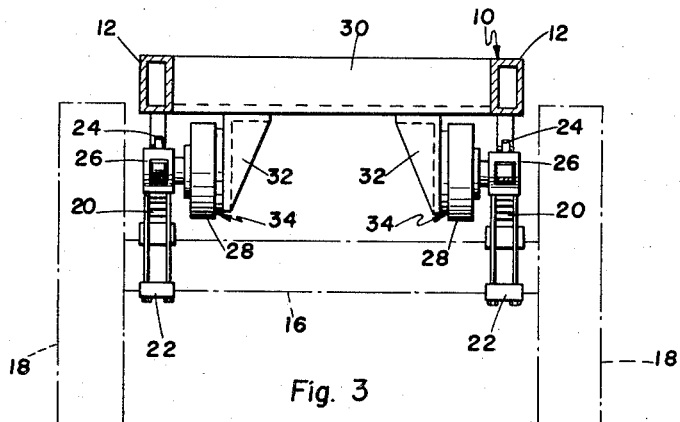
Fig. 3
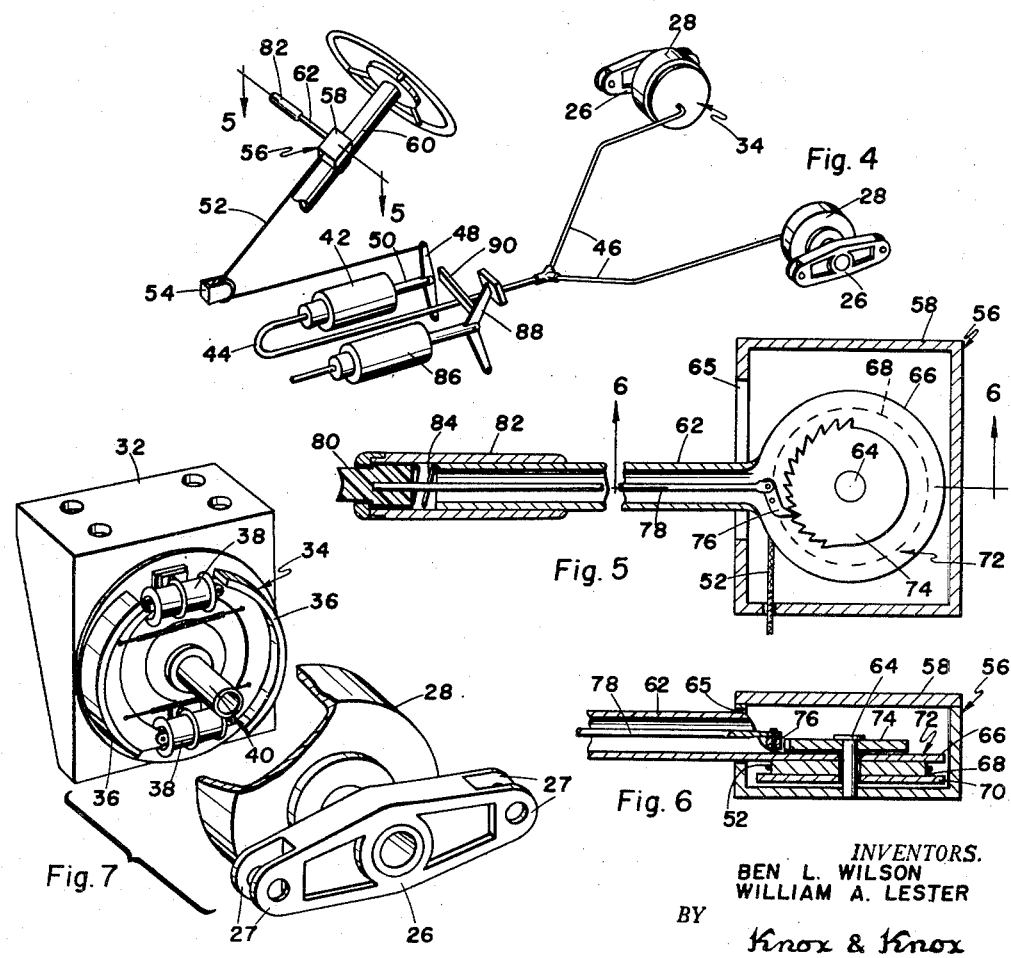
Fig. 4
Fig. 5
Fig. 6
Fig. 7
INVENTORS.
BEN L. WILSON
WILLIAM A. LESTER
BY
Knox & Knox
ATTORNEY IN FACT
FOR APPLICANTS

United States Patent Office 2,788,222
Patented Apr. 9, 1957

2,788,222

SPRING MOUNT FOR THE ADJACENT ENDS OF SUSPENSION SPRINGS IN A DUAL AXLE SYSTEM

Ben L. Wilson, Encinitas, and William A. Lester, Del Mar, Calif.

Application December 18, 1953, Serial No. 398,988

2 Claims. (Cl. 280—104.5)

The present invention relates generally to automotive vehicles and more particular to an improved spring mount for the adjacent ends of suspension springs in a dual axle system.

Heretofore, it has been observed that upon application of the brakes to the wheels of a dual axle arrangement while in motion over rough or uneven surfaces, the wheels behaved in an unsatisfactory manner conducive to hopping, locking, or chattering. This is due to the articulated members comprising the suspension which permit shock to be transmitted from one axle to another. Wheel braking action is lost or seriously hampered under these conditions. This invention provides a positive control of the interconnecting linkage or structure between the axles during wheel braking or independently of the wheel brakes. During the desired braking action of the wheels by the operator, the suspension brake or brakes are simultaneously and automatically applied, eliminating transmission of shock from one axle to the other.

The primary object of this invention is, therefore, to provide a means for rendering independent, at will, the suspension means of individual axles in dual axle suspension systems, while also providing for distribution of road shocks to both axles during normal operation.

Another object of this invention is to provide such a suspension spring mount in which the interconnecting means is fitted with a locking mechanism which in one use thereof may be partially applied by the operator when required, and whereby the mount may be damp-ened or braked against oscillatory motion as desired.

Another object of this invention is to provide a spring mount which may be locked independently of or in conjunction with the conventional vehicle brakes, the independent locking feature being especially useful when the independent suspension of the axles is desired while the wheel brakes are not applied.

Another object of this invention is to provide a suspension spring mount which is inexpensive and practicable to manufacture.

Finally, it is an object to provide a suspension spring mount of the aforementioned character which is simple, safe and convenient to operate, and which will give generally efficient and durable service.

With these and other objects definitely in view, this invention consists in the novel construction, combination and arrangement of elements and portions, as will be hereinafter fully described in the specification, particularly pointed out in the claims and illustrated in the drawings which form a material part of this disclosure and wherein similar characters of reference indicate similar or identical elements and portions throughout the specification and throughout the views of the drawing, and in which:

Fig. 3 is a sectional view taken on the line 3—3 of Fig. 1.

Fig. 4 is a diagrammatic perspective view of the operating mechanism for locking the interconnecting means.

Fig. 5 is an enlarged sectional view taken on the line 5—5 of Fig. 4.

Fig. 6 is a sectional view taken on the line 6—6 of Fig. 5.

Fig. 7 is an exploded perspective view of the interconnecting means and its associated locking mechanism.

Figure 1:
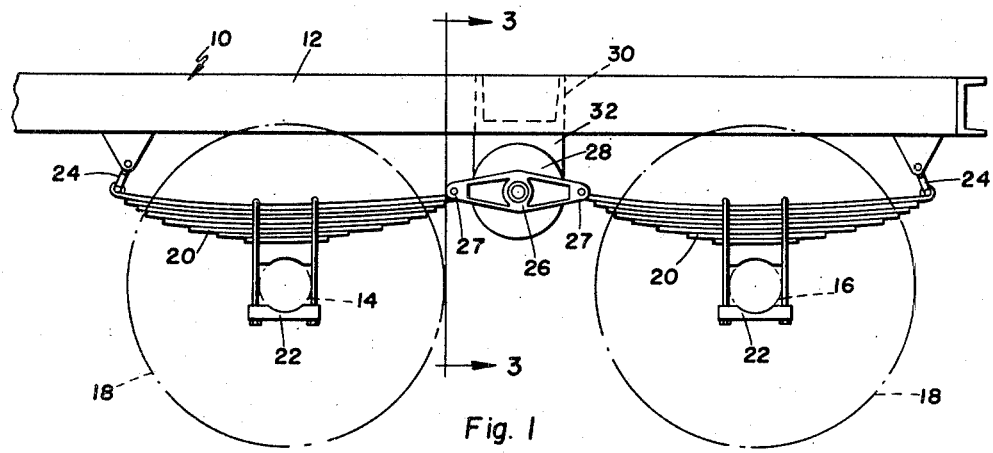
Fig. 1 is a side elevation view of our suspension spring mount mechanism fitted to a vehicle chassis.
Figure 2:
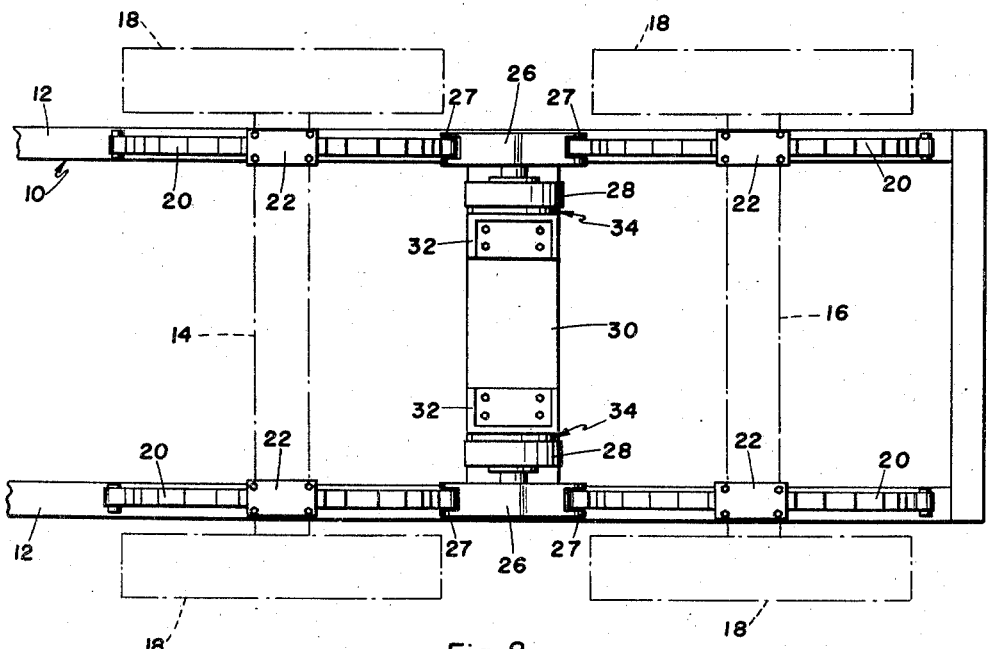
Fig. 2 is a bottom plan view of the structure shown in Fig. 1.

Referring now to the drawings, the suspension structure is fitted to a vehicle chassis or frame 10 such as is used in a truck, said frame having longitudinal side members 12. A pair of axles 14 and 16, carrying wheels 18, are mounted below the frame 10 on a shock absorbing suspension structure which includes a conventional leaf spring assembly 20 secured to each end of each axle by means of a suitable clamp bracket 22. One end of each leaf spring 20 is attached directly to the adjacent side member 12 by a conventional pivoted link 24, while the remaining adjacent ends of each pair of leaf springs are attached to opposite ends of a rocker link 26 as shown in Figs. 1 and 2. Each rocker link 26 has extended end lugs 27 between which the leaf spring ends are pivotally fastened. The rocker links 26 are attached to brake drums 28 through which the locking action is applied.

Fitted between the side members 12 is a cross beam 30 to which are secured support brackets 32. Each support bracket 32 carries a fluid brake assembly 34 comprising pivotally mounted brake shoes 36 which are actuated by fluid cylinders 38, the mechanism being similar to that used in conventional vehicle brakes. Extending outwardly from each brake assembly 34 is a shaft 40 to carry the associated brake drum 28 and attached rocker link 26. The rocker links 26 are mounted for rotary oscillation on the shafts 40 so that vibrations or shocks are equalized between the axles 14 and 16.

It will be evident that by actuating the brake assemblies 34 and locking the brake drums 28, the rocker links 26 may be held against oscillation, thus rendering the axles 14 and 16 independent. The brake assemblies 34 are actuated by a master cylinder 42 connected thereto by a fluid conduit 44 and branch conduits 46. The master cylinder 42 is of conventional design and is operated by an arm 48 intermediately attached to the piston rod 50 of said cylinder. One end of the arm 48 is pivotally attached to the vehicle structure while the other end of the arm is connected to a cable 52. The cable 52 passes around a suitable pulley 54 and is attached to a hand lever assembly 56.

The hand lever assembly 56 comprises a casing 58 which is secured to the steering column 60 of the vehicle or is otherwise mounted in an accessible position. Within the casing 58 is a tubular lever arm 62 pivotally mounted on a pin 64 and extending through a slot 65 in the casing, said lever arm having a disc-like end portion 66. Secured to an end portion 66 are a spacer 68 and a further disc 70, which together comprise a pulley 72 around which the end of the cable 52 is fastened. Secured to the pin 64 is a ratchet disc 74 which is engaged by a pawl 76 pivotally mounted on the end portion 66. Attached to the pawl 76 is a rod 78 which extends through the lever arm 62 and is secured in a push button 80 slidably mounted in the handle 82 at the end of said lever arm. The push button 80 is biased outwardly by a spring 84 to retain the pawl 76 in engagement with the ratchet disc 74.

By pulling the lever arm 62 upwardly, the piston rod 50 is depressed thus actuating the master cylinder 42 and the brake assemblies 34 to lock the rocker links 26. The ratchet mechanism enables the lever arm 62 to be locked in any position to obtain various degrees of braking action in the brake assemblies 34. To unlock the rocker links 26, the push button 80 is depressed, releasing the pawl 76 and allowing the lever arm 62 to be lowered so that the pressure in the master cylinder 42 and the brake assemblies 34 is relieved.

If desired, the device may be arranged to function together with the conventional vehicle brakes as shown in Fig. 4. The master cylinder 42 is mounted alongside the existing brake operating cylinder 86, which is actuated by the brake pedal 88. Attached to the brake pedal 88 is a bar 90 which extends beyond the arm 48 on the master cylinder 42. When the brake pedal 88 is depressed, the bar 90 engages the arm 48 thus simultaneously actuating the master cylinder 42 so that the vehicle brakes and the rocker link locking mechanisms are applied together.

Certain types of existing trucks use an articulated suspension in which dual axles are interconnected to equalize shocks. When driving over rough surfaces vibration is set up in the suspension structure, the vibration often being sufficient to cause violent chattering so that the wheels are not maintained in firm contact with the surface. Under such conditions, sudden braking is relatively ineffective with resultant loss of control. It is thus highly desirable to be able to lock the suspension interconnecting means so that the axles are independently sprung. In this way, positive control and braking action are maintained while driving on rough surfaces due to the relatively firm suspension and lack of bounce or chatter. For normal driving, the interconnecting means is released to obtain the comfort and other advantages offered by the articulated suspension.

The present invention provides for the automatic locking of the rocker links 26 when the vehicle brakes are applied and also enables the operator to lock the mechanism independently when required. Full control of the vehicle is thus maintained at all times.

It should be understood that the structure of the hand lever assembly 56 is merely illustrative of the many mechanisms suitable for this purpose and should not be considered limiting. Similarly, the structure of the suspension and the mounting of the brake asemblies 34 together with the rocker links 26 are also illustrative, the actual construction being dictated by the particular vehicle to which the device is fitted.

The operation of this invention will be clearly comprehended from a consideration of the foregoing description of the mechanical details thereof, taken in connection with the drawings and the above recited objects. It will be obvious that all said objects are amply achieved by this invention.

Further description would appear to be unnecessary.

It is understood that minor variations from the form of the invention disclosed herein may be made without departure from the spirit and scope of the invention, and that the specification and drawings are to be considered as merely illustrative rather than limiting.

We claim:

1. In a wheeled vehicle having wheel brakes, vehicle wheel brake actuating means, a frame, a pair of adjacent wheel carrying axles, springs operably attached to each of said axles at each side of said frame and supporting the frame thereon, pivotally mounted rocker links intermediate said springs, each of said springs having one end secured to an end of the adjacent rocker link so that said springs are interconnected in pairs, the other ends of said springs being secured to said frame, frictional braking means engaging said rocker links to lock the same against pivotal movement, and actuating means for operatively connecting said braking means to the vehicle wheel brake actuating means, whereby said braking means and the wheel brakes are operated simultaneously.

2. In a wheeled vehicle having wheel brakes, vehicle wheel brake actuating means, a frame, a pair of adjacent wheel carrying axles, springs operably attached to each of said axles at each side of said frame and supporting the frame thereon, pivotally mounted rocker links intermediate said springs, each of said springs having one end secured to an end of the adjacent rocker link so that said springs are interconnected in pairs, the other ends of said springs being secured to said frame, frictional braking means engaging said rocker links to lock the same against pivotal movement, and actuating means for operatively connecting said braking means to the vehicle wheel brake actuating means, whereby said braking means and the wheel brakes are operated simultaneously, and manually actuated means connected to said braking means to actuate the same independently of the wheel brakes.

References Cited in the file of this patent

UNITED STATES PATENTS

| 1,667,275 | Warhus | Apr. 24, 1928 |
| 1,947,337 | Fageol | Feb. 13, 1934 |
| 2,248,435 | Pleines | July 8, 1941 |

FOREIGN PATENTS

| 503,441 | Great Britain | Apr. 6, 1939 |